Figure 1:
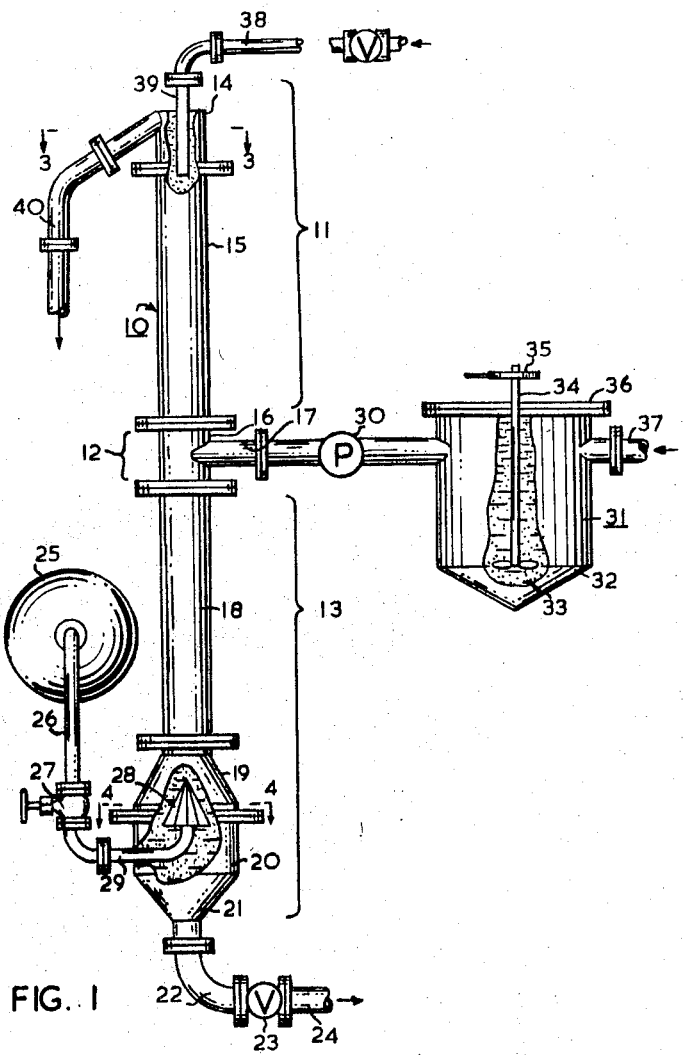

Sept. 5, 1967     P. BOUTIN ET AL     3,339,730
FROTH FLOTATION METHOD WITH COUNTER-CURRENT SEPARATION
Filed June 19, 1963     4 Sheets-Sheet 1

Inventors
Pierre Boutin
Remi J. Tremblay
By Stevens, Davis, Miller & Mosher
Attorneys

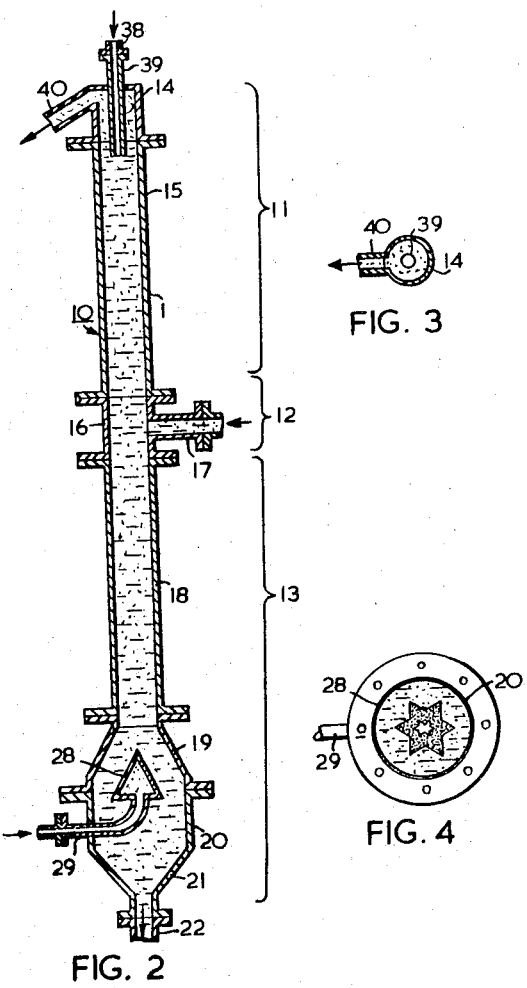

Sept. 5, 1967   P. BOUTIN ET AL   3,339,730
FROTH FLOTATION METHOD WITH COUNTER-CURRENT SEPARATION
Filed June 19, 1963   4 Sheets-Sheet 4

Inventors
Pierre Boutin
Remi J. Tremblay
By Stevens Davis Miller & Mosher
Attorneys United States Patent Office 3,339,730
Patented Sept. 5, 1967

3,339,730
FROTH FLOTATION METHOD WITH
COUNTER-CURRENT SEPARATION
Pierre Boutin, Ottawa, Ontario, and Remi J. Tremblay, Atikokan, Ontario, Canada, assignors to Column Flotation Co. of Canada, Ltd., Ottawa, Ontario, Canada, a company of Canada
Filed June 19, 1963, Ser. No. 288,931
Claims priority, application Canada, July 14, 1962, 853,771; June 4, 1963, 877,145
13 Claims. (Cl. 209—166)

The present application is a continuation-in-part of application Ser. No. 217,130, now abandoned, filed Aug. 15, 1962.

This invention relates to a method for the separation and recovery of one constituent from another constituent in a comminuted mixture of such constituents. More particularly, it relates to a method and apparatus for the separation and recovery of values from comminuted ores, and more particularly by a flotation technique.

It is now well-known that a large number of values in ores may be separated from the gangue etc. by a flotation technique. These conventional separation procedures have suffered numerous disadvantages including low efficiency, the need for a bank of units to carry out consecutive batch operations and considerable maintenance requirements.

An object of the present invention is the provision of a continuous method for the counter-current separation and recovery of one constituent from a comminuted mixture containing such constituent and other constituents in a vertically upright restricted zone.

Another object of this invention is the provision of a continuous method for the counter-current separation and recovery of values from a comminuted ore in a vertically upright restricted zone, wherein the values are flotated-off from an upper region of said zone, the gangue and residue is recovered from a lower region of said zone and wherein the ore being separated is fed to an intermediate region of said zone.

Yet another object of this invention is the provision of a continuous method for the counter-current separation and recovery of values from a comminuted ore for a vertically upright zone wherein the gangue and residue are flotated-off from an upper region of said zone, the values are recovered from a lower region of said zone and wherein the ore being separated is fed to an intermediate region of said zone.

A further object of this invention is the provision of an improved method for the froth flotation separation of values from gangue in a comminuted ore wherein there is enhanced recovery coupled with enhanced grade.

The term "recovery" as used herein is intended to mean the ratio of solid material recovered to the solid material in the feed.

The term "grade" is intended to mean the ratio of the desired material in the material recovered to the total material recovered.

The present invention is operative in the froth flotation of any ore which has successfully been separated into value and gangue by froth flotation in the past. Non-limiting examples of suitable ores include:

(1) sulphides, for example cinnabar, cobaltite, smaltite, erythrite, chalcocite, covellite, chalcopyrite, bornite, galena, pyrite, marcasite, pyrrhotite, arsenopyrite, linneite, molybdenite, realgar, argentite and sphalterite;
(2) native metals, for example, gold, silver, copper and bismuth;
(3) oxides, for example, bauxite, cassiterite, chromite, cuprite, ilmenite, hematite, specularite, manganosite, molybdite, rutile, alunite, anglesite and cerrisite;
(4) non-silicate minerals of alkali and alkaline earth metals, for example, barite, calcite, celestite, cryolite, dolomite, fluorospar, magnesite, strontianate, halite and sylvite;
(5) silicates, for example, andalusite, brucite, olivine, kyanite, mica, quartz and spodumene;
and
(6) inert minerals, for example coal and graphite.

These above, and other ores may be flotated according to the present invention through the use of the conventional regulators, depressants, activators, principal promoters, frothers, promoter-assisting agents and selectivity-assisting agents well-known to those skilled in the art and selected for each of the desired ore. Conventional promoters or collectors, those reagents which provide ores to be floated with a water repellant surface that will adhere to air bubbles, include anionic agents, for example the xanthates, the dithiosphosphates and the fatty acids and the cationic agents such as the fatty amine acetates. Non-limiting examples of such conventional promotors include:

(1) anionic agents, for example, xanthates for example, lauryl or octyl xanthates or a xanthate and Pb-thallium group reaction product, thiophosphates, mercaptans, thioalcohols, thiocarbanilides, mercapto-benzothiazoles and organic sulphides, for example dixanthogens and thiuram disulphides;
(2) carboxylic agents, for example fatty acids, for example aleric acid, tall oil, tall oil soap, naphthenic acid, black liquor soaps and cottonseed oil foots;
(3) sulphoxy agents for example, Turkey-red oil, and higher alcohol sulphates, for example cetyl sulphate;
(4) cationic agents, for example, amines, alkylalamines, α-naphthylamines, onium salts, isoureas and aldoximes;
and
(5) fuel oil and kerosene.

Non-limiting examples of suitable regulators include sodium silicate, sodium hydroxide, sodium carbonate, polyphosphates, hydrogen fluoride, sulphuric acid, saturated brines and lime. Non-limiting examples of suitable depressants include excess sodium silicate, caustic starch, hydrogen fluoride, lactic acid, aluminium chloride, ferric chloride, sulphuric acid, starch, sodium, hydroxide, quebracho, dichromate, Palcaton, Palconate, lime, bismuth-nitrate, tannin, barium chloride, alum, bleaching powder, citric acid, gelatin, dextrine, and glue. Non-limiting examples of suitable activators include barium salts, lead salts, for example barium chloride and lead nitrate, phosphomolybdic acid, phosphotungstic acid, barium sulphide, copper sulphate, hydrogen fluoride, sodium sulphide, and ferric chloride.

Non-limiting examples of suitable frothers include cresylic acid, pine oil, aniline, xylidine, pyridine and eucalyptus oil. Non-limiting examples of suitable promoter-assisting agents include kerosene, fuel oil, aniline, pyridene, orthotoluidine, various detergents, pine tar oil, higher alcohol sulphates and creosotes. Non-limiting examples of suitable selectivity assisting agents include sodium silicate, citric acid, hydrogen fluoride, starch, dextrine, quebracho, gum arabic, polyphosphates, sulphuric acid, fluosilicates, dichromates, Palcaton, Palconate, various acids, alum, alkali resinates, sodium fluoride, caustic starch and guar gum.

It will, of course, be appreciated that the particular regulator, depressant activator, promoters, frothers, promotor-assisting agents and selectivity-assisting agent is selected according to the particular ore being treated. Thus, for example, to recover the mineral barite from an ore, a recommended regulator is either sodium carbonate or sodium silicate, a recommended depressant is either ferric chloride or aluminum chloride, a recommended activator is either a barium salt or a lead salt, a recommended promoter is oleic acid or a higher alcohol sulphate, a recommended frother is pine oil or cresylic acid, a recommended promoter-assisting agent is N-octadecyl disodium sulphosuccinate and a recommended selectivity-assisting agent is either sodium silicate or citric acid.

The proportions of the various ingredients added to the ore is within the range well-known to those skilled in the froth-flotation art. Thus, the usual amount of promoters used is within the range of 0.01–0.2 lb./ton for the aryl dithiophosphoric acid type; 0.05–0.2 lb./ton for the xanthate type; 0.05–0.5 lb./ton for the thiocarbanilide type; 0.2–2.0 lb./ton for the fatty acid-type of vegetable origin; 0.1–0.5 lb./ton for the amine or amine salt type; 0.5–3.0 lb./ton for the anionic sulphonate-type; 0.2–2.0 lb./ton for the fatty acid or fatty acid soaps type; and 0.5–4.0 lb./ton for the kerosene or hydrocarbon type.

With respect to the various flotation modifying agents, the following proportions may be used:

(1) Alkalies: lime, 0.5–5.0 lb./ton; soda ash or alkaline silicates, 0.5–3.0 lb./ton; sodium hydroxide, 0.5–4.0 lb./ton; and alkaline phosphates, 0.5–2.0 lb./ton;
(2) Acids: sulphuric, 0.5–5.0 lb./ton; hydrofluoric and phosphoric, 0.5–4.0 lb./ton; and citric and tactic, 0.5–2.0 lb./ton;
(3) Cyanogen compounds: alkaline cyanides, 0.01–0.5 lb./ton; and ferrocyanides and ferricyanides, 0.1–2.0 lb./ton;
(4) Sulphites and sulphides: alkaline sulphites, 0.5–4.0 lb./ton; sulphur dioxide, 1.0–10.0 lb./ton; hydrogen sulphide, 0.2–2.0 lb./ton; alkaline sulphides, 0.5–5.0 lb./ton; and alkaline oxychlorides, 0.5–2.0 lb./ton;
(5) Salts of metal ions: copper sulphate, chromic acid and dichromates, 0.2–5.0 lb./ton; mercuric nitrate, lead nitrate, lead acetate, aluminum sulphate, aluminum chloride, manganates and permanganates; 0.1–2.0 lb./ton; and ferrous sulphate and ferric sulphate 0.1–1.0 lb./ton; and
(6) Organic colloids; quebracho, tannic acid, Palcoton and Palconate, and glue, 0.1–0.5 lb./ton; synthetic organic depressants, 0.1–1.0 lb./ton; and starch, 0.1–1.0 lb./ton.

In the case of frothers, in conventional practice they are used to enhance and assist in the introduction of small air bubbles into the flotation pulp and the collection of the unbroken mineral-laden bubbles on the pulp surface. For this purpose frothers such as the synthetic higher alcohol type have heretofore been used in amounts of from 0.01–0.5 lb./ton; pine oil has been used in an amount of 0.03–0.2 lb./ton; while cresylic acid and eucalyptus oil have been used in an amount of 0.05–0.2 lb./ton. However, in the present invention, the frother is used to control the air bubble size. To achieve this end, the amount of frother which may be used is generally less than that used heretofore. The bubble size is controlled in this manner preferably to achieve optimum surface are of the bubbles per volume of the column.

The rate of introduction of aqueous washing medium at the top of the vertically erect column, the rate of introduction of air at the bottom of the vertically erect column and the rate of introduction of feed slurry at a point between the top and the bottom of the vertically erect column are all interdependent.

Stated in its broadest terms, however, the column should be operated at its optimum capacity for a given ore while retaining a maximum recovery, but at conditions which do not approach "flooding" conditions. By "flooding" conditions is meant that the downward velocity of the material in the column is such that it decreases the velocity of the rising bubbles to such an extent that more bubbles are produced than can escape from the top of the column. This results in a "compacted bubble condition" which leads to a violent swirling action and explosive ebullition within the column, which severely hinders and may sometimes completely interfere with the separation.

Stated another way, moreover, the air pressure, which controls the rate of introduction of air at the bottom of the column, must be greater than the hydrostatic pressure on the means which provides the air bubbles i.e. the bubbles or diffuser. This expression may be expressed mathematically, as follows:

$$p = hd + k$$

where $p$ is the pressure of air delivered to the bubbler or diffuser,
$h$ is the height of the column,
$d$ is the average density of the contents of the column and $k$ is a factor (which is greater than 0 but less than 7) which is a characteristic of the bubbler or diffuser A pressure of air of up to about 20 p.s.i.g. is usually used.

It is clear from the above formula and description that the amount of air passing through the column per unit time per unit area of cross-section of the column is a function of the slurry flow rate and the density of the slurry, the number of air bubbles, and the size of the air bubbles. The means to form the bubble of air may be any suitable perforated member. One type which has been found suitable is a conically shaped porous metal air diffuser, generally having perforations of a size 5 microns to 2500 microns with a size of 10 microns being particularly preferred. With perforations within this range, the bubble size would normally range from about 1000 to about 10,000 microns with a preferred size being about 1600 microns. Of course, as specified above, the frother is used to control the bubble size and so the bubble size can be maintained at a reasonable size even with larger perforations in the perforated member. A size of between 3000 microns and 6000 microns is permissible although other sizes are possible. Another type which has been found suitable is a cylinder having an ellipsoidal cross-section, whose closed ellipsoidal end is of porous metal having perforations of the sizes referred to hereinabove. Additionally porous metal plates having apertures of the sizes referred to hereinabove, porous ceramic plates having apertures of the sizes referred to hereinabove and other means such as punctured rubber, filter cloth, etc., with apertures of the sizes referred to hereinabove are suitable. Such means must be connected to a source of air under pressure which is separated from the interior of the column except through such porous means.

As in conventional practice, the ore is crushed, screened, ground and classified and formed into an aqueous slurry. In the present invention, however, the slurry is formed in an agitation conditioning tank, which contains means for intimately mixing the ground ore with the water and with the necessary conditioning and flotation agents. The slurry usually contains from about 5 to about 70% solids, but this is dependent upon the particular ore being slurried. The slurry from the agitation conditioning tank must be in pumpable form and is fed at such a rate that the slurry entering the column as feed contains more solids than are in the column at any particular instant of time. This may require changes in the flow rate and/or solids content of the slurry from time to time. The conditioning and flotation agents are added in conventional quantities to the slurry in the agitation conditioning tank, and the required amount of frother to control the bubble size is also added at this time.

The washing liquid entering at the upper portion of the column is an aqueous system. It usually is water, but for certain ores it may be a dilute aqueous solution of acids, etc. The rate of flow of such aqueous system is, as specified hereinabove, dependent upon the various parameters of the system. Generally speaking the rate of flow is such that it dilutes the slurry to prevent the unseparated slurry from rising.

By one broad aspect of this invention, there is provided a method for the separation of one constituent from another constituent in a comminuted mixture of those constituents, the method comprising, firstly, establishing and maintaining a downwardly flowing stream of aqueous medium within a vertically aligned, elongated zone, said aqueous medium being introduced at an upper portion of said zone; then establishing and maintaining an upwardly moving stream of air bubbles originating at a lower portion of that zone wherein the downward velocity of said aqueous medium is not greater than the upward velocity of said stream of air bubbles; then establishing an aqueous slurry of that comminuted mixture and at least one conditioning agent which renders one of the constituents hydrophobic; then introducing that slurry into that zone at a region in the zone above the lower portion but below said upper portion at such a rate that the solids content of the slurry is greater than the solids content in said zone; then withdrawing one constituent and air as overflow at the upper region of said zone, said one constituent and said air moving co-currently to said upper portion; and finally withdrawing the other constituent and water as underflow at the lower region of said zone, said other constituent and said aqueous medium moving co-currently to said lower portion.

This method may be used to collect the values in the ore in the form of solid particles adhered to the air bubbles, with the gangue being carried out as underflow from the bottom of the column, or alternatively, may be used to collect the gangue in the form of solid particles adhered to the air bubbles and to collect and recover the values as underflow. Advantageously, the method is conducted by correlating the rate of input of water with the rate of input of slurry feed and the rate of underflow to maintain a substantially constant upper level in the column. Also, the air bubbles may be produced by passing the air under pressure through a perforated member, the pressure being up to about 20 p.s.i.g., the size of perforations being about 5 to about 2500 microns, with the air bubbles having a size of about 1000 to about 10,000 microns. The slurry usually has a solids content of about 5-75%. The process is particularly suited for the separation of quartz as overflow from iron values as underflow, the separation of quartz and dolomite as overflow from iron values as underflow, dolomite and iron values as overflow from quartz as underflow, of molybdenum sulphide and bismuths as overflow from gangue as underflow, of molybdenum sulphide as overflow from gangue as underflow and copper values as overflow from gangue as underflow.

The apparatus used in carrying out the method of this invention preferably includes an upper zone, an intermediate zone and a lower zone. The water inlet means usually extends into the upper portion of the upper zone. The slurry feed inlet is to the intermediate zone. The bubbler is situated in the lower zone and at the lower portion of the lower zone there is provided outlet means for the underflow. Collecting means are provided at the upper portion of the upper zone. Preferably, means are included for the preparation of the feed slurry. A preferred feature of the invention is the reduction of the cross-sectional area of the upper zone by about ¼ to ¾ of the area of the other two zones, as by a reduction in its diameter or by insertion of an axial solid tube therein or an axial slurry feed line. In the latter case, the water inlet means may be concentric with the slurry feed line. The bubbler may be a conical member with fluted perforated walls, or an elliptical cylinder, the top of which is perforated, these vessels being connected to a source of air under pressure. In each case the perforations may be about 5 to about 2500 microns in size. In another embodiment the upper collecting means includes a top chamber to an inclined weir therein and an inclined outlet cooperating with the weir.

Figures 5, 6, 7:
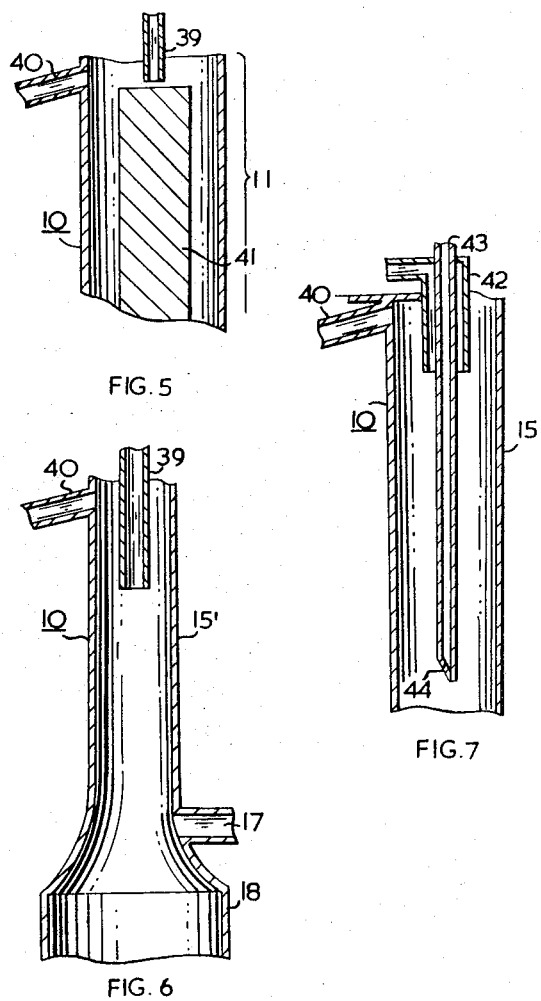
Figure 8:
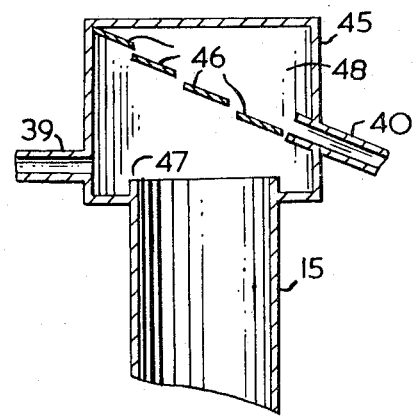
Figures 9, 10:
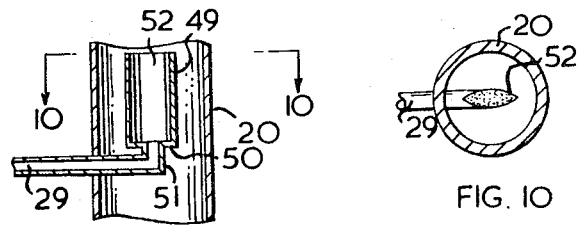

In the drawings,

FIG. 1 is a schematic view partly broken away, of one embodiment of apparatus according to this invention, FIG. 2 is a vertical cross-section of the flotation column of FIG. 1, FIG. 3 is a section along the line III—III of FIG. 2, FIG. 4 is a section along the line IV—IV of FIG. 2, FIG. 5 is a vertical cross-section of a top portion of a flotation column according to another aspect of this invention, FIG. 6 is a vertical cross-section of a top portion of a flotation column according to another aspect of this invention, FIG. 7 is a vertical cross-section of a top portion of a flotation column according to yet another aspect of this invention, FIG. 8 is a vertical cross-section of a top portion of a flotation column according to still another aspect of this invention, FIG. 9 is a vertical cross-section of a bottom portion of a flotation column according to a further aspect of this invention, and FIG. 10 is a section along the line X—X of FIG. 9.

Turning first to FIG. 1, the flotation column indicated generally at 10 comprises an upper section 11, an intermediate section 12 and a lower section 13. The cross-section of the flotation column may be circular, elliptical, square, rectangular or any other transverse section of a plan geometrical figure. As shown in FIGS. 1–4, the cross-section of the column is circular. In addition the length of the column should be greater than the width thereof, and a ratio of length:width 6:1 or more has been found to be satisfactory. It is desirable to have the inside surfaces of the column smooth to minimize turbulence.

As shown in FIGS. 1–4, the column 10 is constructed of a plurality of sections in vertical axial alignment. Upper section 11 comprises two sections 14 and 15 which are each flanged to facilitate assembly by bolts or other means not shown in the drawings.

Intermediate section 12 is compressed of a main flanged section 16 to facilitate assembly by bolts or other means not shown in the drawings, and an integral inlet leg 17, also provided at its open end with a flange.

The lower section 13 comprises a flanged main portion 18, a flanged inverted frusto-conical portion 19 and a flanged outlet portion 20 including a cylindrical section terminating in an inverted frusto-conical outlet 21. The frusto-conical outlet is attached to an elbow conduit 22 which conducts effluent from the column through valve 23 to outlet conduit 24.

Air under pressure in tank 25 is led by line 26 through valve 27 to a diffuser or bubbler 28 disposed in portion 19, by means of elbow pipe 29. As shown in FIGS. 1–4, the diffuser or bubbler 28 is of approximately conical shape having its conical wall fluted vertically and provided with a plurality of small orifices. Air under pressure passes through such plurality of orifices and is delivered to the lower portion 13 of the column.

The feed slurry is pumped into the central portion 12 through inlet leg 17 by means of pump 30 from agitating conditioning tank 31. This tank has a generally cylindrical shape, terminating in a frusto-conical bottom 32. Within the tank is an impeller 33 fixed to a vertical shaft 34 which is adapted to be rotated by means (not shown) associated with a pulley 35 splined to the shaft 34. The tank is provided with a removable cover 36, to enable the ore and flotation ingredients to be added to the tank. Water, which forms the aqueous phase of the slurry, is admitted through inlet conduit 37.

Downwardly flowing aqueous medium is admitted to the upper portion 11 of the column 10 by means of valved inlet conduit 38 which terminates in a feed tube 39 extending into the upper portion 11 of the column 10.

Foam, consisting of solid particles adhered to the rising air bubbles originating from diffuser or bubbler 28, collects in section 14 and is drawn-off through a downwardly disposed angularly extending discharge conduit 40, at the top of section 14.

FIGS. 5–8 depict alternative constructions of the upper portion 11 of the column 10. In the embodiments shown in FIGS. 5, 6 and 7 a means is provided in the upper zone to reduce the cross-sectional area thereof. This is for the main purpose of increasing the velocity of flow of the aqueous washing medium to enhance the contamination minimizing effect in the upper portion 11. In FIG. 5, this cross-sectional area reducing means comprises a solid tube 41 inserted in the region between the discharge conduit 40 and the inlet leg 17. In FIG. 6, the cross-sectional area reducing means is provided by forming the upper portion 11 between the discharge conduit 40 and the inlet leg 17 of a tube 15' of reduced diameter than the diameter of tube 18. In FIG. 7, the cross-sectional area reducing means is provided by a feed inlet conduit 43 extending downwardly along the longitudinal axis of the column 10 to a region corresponding to the intermediate portion 12. The conduit 43 is provided with a nozzle aperture 44. In addition, the aqueous washing medium is admitted through conduit 42 which is concentric with inlet tube 43.

The embodiment shown in FIG. 8 relates to a modified foam removal system. In that figure there is shown an enclosed box 45 having a plurality of sloping weirs 46 therein, leading to the discharge conduit 40. The foam is adapted to pass through the weirs 46 into zone 48 from which it is withdrawn through discharge conduit 40. The aqueous washing medium enters through radial inlet tube 39 and its flow is directed by rims 47 upstanding from the upper tubular section 15.

The embodiment of FIGS. 9 and 10 is directed to a modified diffuser or bubbler. The bubbler or diffuser 49 is an ellipsoidal cylinder having its bottom 50 of non-porous material and provided an inlet conduit 51 for the air under pressure admitted through line 29. Its sides are also non-porous, but its elliptical cross-sectioned top 52 is provided with a plurality of 10 micron diameter orifices.

The operation will now be described with reference to FIG. 1 for an ore in which it is desired for the values to be froth flotated. Of course it is equally applicable for ores in which it is desired for the gangue and other extraneous materials to be froth flotated, leaving a residue of values.

Aqueous washing medium for example water, is passed downwardly through the column 10 from inlet conduit 38 and 39 and out through discharge line 22 and 24 through open valve 23. Air is admitted, under the required pressure to overcome the hydrostatic pressure, through lines 26 and 29 to the diffuser 28, where an upwardly directed stream of bubbles is caused to be directed through the column 10. The ore, in the form of an aqueous slurry of the desired solids content, and containing a promoter or collector which provides the values with a water-repellant surface which will adhere to air bubbles, as well as any desired controlling or modifying agents and the required amount of frother to control air bubble size, is then pumped via pump 30 from tank 31 to inlet leg 17 and thence to the intermediate portion 12 of the column 10. The values, having such water-repellant surface, adhere to the air bubbles and are carried upwardly to be removed at discharge conduit 40. The gangue and other extraneous material, not having such water-repellant coating are carried downwardly with the water and are discharged, along with the water, through discharge line 22 and 24.

As stated hereinbefore, if it is desired to remove the gangue and other residues as foam, such foam would be discarded, if not needed, but the values carried along with the water, will be recovered at discharge line 24.

The following examples are given still further to illustrate the present invention.

EXAMPLE 1

*Amine flotation of quartz from iron ore*

PROCEDURE

Ten barrels of iron ore were received from the Iron Ore Company of Canada. This shipment, 60% of which were of a size minus 325 mesh, known as Lean Blue Ore, averaged 54 to 56% Fe, 15 to 17% $SiO_2$ and approximately 3% loss on ignition.

The slurry feed batch, approximately 75% solids, was conditioned with NaOH (pH 11) then with 1 lb./ton solids of dextrin and immediately after this addition, 1 lb./ton solids of primary coconut oil amine was added. The feed was pumped into a column similar to that shown in the drawings.

Half an hour after the column was operated, timed samples of underflow (from conduit 24) and overflow (from conduit 40) were taken periodically, dried, weighed and analysed. The density and flow rate of the underflow were kept constant.

One hundred and ninety six experiments were done, each experiment lasting at least 1½ hours.

The following results are representative experiments carried out according to the outlined procedure.

TABLE 1

|  | Test 2-1 | Test 5-1 | Test 37-1 | Test 42-1 | Test 43-1 | Test 46-1 | Test 56-2 |
| --- | --- | --- | --- | --- | --- | --- | --- |
| Feed: |  |  |  |  |  |  |  |
| Density, g./ml | 2.33 | 2.30 | 2.30 | 2.30 | 2.3 | 2.3 | 1.98 |
| Solids, percent | 75 | 74.5 | 74.5 | 74.5 | 74.5 | 74.5 | 65.0 |
| Flowrate, ml./min | 146 | 66 |  |  |  |  |  |
| Underflow: |  |  |  |  |  |  |  |
| Density, g./ml | 1.57 | 1.45 | 1.51 | 1.61 | 1.63 | 1.70 | 1.59 |
| Solids, percent | 46 | 39.5 | 43.5 | 48 | 49.0 | 52.0 | 47.5 |
| Flowrate, ml./min | 205 | 202 | 800 | 800 | 800 | 800 | 800 |
| Overflow: flowrate, ml./min | 30 | 28.6 | 99.8 | 80.8 | 118.5 | 131 | 107 |
| Air rate: ml./min. NTP | 450 | 325 | 1,600 | 2,400 | 2,000 | 1,000 | 1,800 |
| Column Characteristics: |  |  |  |  |  |  |  |
| Diameter, inch | 1 | 1 | 2 | 2 | 2 | 2 | 2 |
| Upper section, feet | 6 | 6 | 21 | 21 | 21 | 14 | 20 |
| Lower section, feet | 3 | 3 | 6 | 12 | 12 | 7 | 7 |
| Capacity, ton/inch² day | .36 | .29 | .31 | .35 | .38 | .42 | .36 |
| Results: |  |  |  |  |  |  |  |
| Underflow— |  |  |  |  |  |  |  |
| Percent Fe | 63.5 | 65.0 | 62.7 | 65.9 | 64.3 | 64.1 | 62.0 |
| Percent $SiO_2$ | 2.1 | 2.0 | 3.4 | 1.4 | 4.0 | 3.5 | 5.8 |
| Overflow— |  |  |  |  |  |  |  |
| Percent Fe | 11.3 | 23.5 | 12.7 | 10.0 | 11.0 | 12.5 | 8.7 |
| Percent $SiO_2$ | 82.7 | 64.6 | 80.7 | 83.5 | 77.9 | 81.3 | 86.2 |
| Percent Fe Recovery | 96.7 | 91.8 | 96.5 | 98.1 | 96.6 | 96.5 | 97.6 |

These results show that the procedure of the present invention may be used to separate quartz, as the frothed overflow, from iron ore, as the underflow, with a percent iron recovery of between 91.8 and 97.6.

EXAMPLE 2

*Flotation of quartz and dolomite from iron ore*

PROCEDURE

Three barrels of Cyclone products were received from the Iron Ore Company of Canada. This shipment from Carol Lake, Labrador, averaged 27% Fe, 55% $SiO_2$ and 9% dolomite. The iron oxide is mostly specularite with some magnetite.

The slurry feed batch, approximately 72% solids, was conditioned with lime, corn starch, petroleum sulphonated oil and tall oil. In the following series of experiments when the column reached equilibrium all of the underflow and overflow were collected, dried, weighed, sampled and analysed.

TABLE 2
Test CP-1

Feed:
| | |
|---|---|
| Density g./ml. | 2.0 |
| Solids percent | 72 |
| Weight lb. | 250 |

Reagent:
| | |
|---|---|
| Lime lb./ton | 0.5 |
| Starch lb./ton | 0.25 |
| Sulphonated petroleum lb./ton | 0.25 |
| Tall oil lb./ton | 0.25 |

Underflow:
| | |
|---|---|
| Density | 1.21 |
| Flowrate ml./min. | 795 |
| Weight lb. | 29.1 |

Overflow:
| | |
|---|---|
| Weight lb. | 22.1 |
| Time hr. | 2.2 |

Air rate ml./min. _____ 650
Column characteristics:
| | |
|---|---|
| Diameter inch | 2 |
| Upper section feet | 15 |
| Lower section feet | 6 |
| Capacity ton/inch$^2$ day | 0.089 |

Results:
Underflow—
| | |
|---|---|
| Percent Fe | 43.4 |
| Percent $SiO_2$ | 26.0 |
| Percent dolomite | 11.9 |

Overflow—
| | |
|---|---|
| Percent Fe | 4.7 |
| Percent $SiO_2$ | 82.0 |
| Percent dolomite | 11.3 |

Percent Fe Recovery _____ 90.4

The results in Table 2 indicate that quartz and dolomite may be floated off from iron values in iron ore, in a column and process of the present invention, resulting in a recovery of 90.4% Fe.

EXAMPLE 3

*Flotation of dolomite and iron ore from quartz*

PROCEDURE

Five barrels of fine spiral tailings were received from Iron Ore Company of Canada. This shipment averaged 23% iron oxide, 66% quartz and 11.5% dolomite. The sieve analysis was as follows:

| Mesh: | Percent wt. |
|---|---|
| +65 | 7.4 |
| +150 | 24.4 |
| +200 | 17.1 |
| +325 | 18.0 |
| −325 | 33.1 |

The slurry feed at approximately 70% solids was conditioned with $H_2SO_4$ (pH=6.3) sulphonated petroleum oil and tall oil. All of the underflow and overflow were collected, weighed, sampled and analysed. The results were as follows:

TABLE 3

Feed: weight of solids _____lbs__ 1860
Reagent:
| | | |
|---|---|---|
| $H_2SO_4$ (pH=6.3) | lb./ton | 1.3 |
| Sulphonated petroleum | do | ½ |
| Tall oil | do | 1 |

Underflow:
| | |
|---|---|
| Time hours | 33 |
| Flowrate, typical ml./min. | 800 |
| Density, typical g./ml. | 1.28 |
| Wt. of solids lbs. | 995 |

Air Rate _____ml./min__ 1050
Overflow: wt. of solids _____lbs__ 762
Column characteristics:
| | |
|---|---|
| Diameter inches | 2 |
| Upper section feet | 15 |
| Lower section do | 6 |
| Capacity tons/inch$^2$ day | .22 |

Results:
Underflow—
| | |
|---|---|
| Percent Fe | 1.6 |
| Percent $SiO_2$ | 97.1 |
| Percent dolomite | 0.8 |

Overflow—
| | |
|---|---|
| Percent Fe | 35.5 |
| Percent $SiO_2$ | 24.6 |
| Percent dolomite | 24.7 |

Percent Fe recovery _____ 94.3

The results in Table 3 indicate that dolomite and iron values may be flotated from quartz in an iron ore, using the apparatus and process of the present invention, resulting in a recovery of 94.3% Fe.

EXAMPLE 4

*Bulk and selective flotation of molybdite*

The column and the process of the present invention were used to effect bulk flotation and a selective flotation of molybdite. The detailed operating conditions and test results for Run No. 4, a bulk flotation and Run No. 5, a selective flotation are given below:

Run No. 4.—Bulk Flotation (Mo and Bismuth)
| | |
|---|---|
| Lower zone | 10 ft.-2″ dia. |
| Upper zone | 9 ft.-2″ dia. |

Reagents:
| | |
|---|---|
| Kerosene | 0.1#/ton. |
| Pine oil and Dowforth 250 (1:1) | 0.1#/ton. |
| Z-6 (potassium amyl xanthate) | 0.1#/ton. |
| Air | 4.0 s.c.f.m. |
| Flowrate | 1356 ml./min. average. |
| Solids | 13% average. |

TABLE 4

| | Wt. | Percent Wt. | Assay | | | | | Distribution | |
|---|---|---|---|---|---|---|---|---|---|
| | | | $MoS_2$ | Bi | Cu | Fe | Insol. | $MoS_2$ | Bi |
| $MoS_2$ | 0.24 | 0.9 | 47.8 | 9.60 | 0.35 | 9.60 | 18.1 | 92.3 | 84.5 |
| Tails | 25.30 | 99.1 | 0.036 | 0.016 | | | | 7.7 | 15.5 |
| Feed | 25.54 | 100.0 | 0.47 | 0.10 | | | | 100.0 | 100.0 |

Run No. 5.—Selection Flotation (Molybdite Only)

Lower zone _____ 10 ft.-2" dia.
Upper zone _____ 9 ft.-2" dia.
Reagents:
    Kerosene _____ 0.1#/ton.
    Pine oil Dowfroth 250 (1:1) _____ 0.1#/ton.
    Sodium silicate _____ 0.2#/ton.
Air _____ 4.0 s.c.f.m.
Flowrate _____ 1360 ml./min.
Density _____ 1.08.
Solids _____ 12%.

TABLE 5

| | Assay | | | | | | | | Distribution | |
|---|---|---|---|---|---|---|---|---|---|---|
| | Wt. | Percent Wt. | MoS₂ | Bi | Cu | Fe | Pb | Insol. | MoS₂ | Bi |
| MoS₂ | 0.12 | 0.5 | 79.4 | 6.56 | 0.26 | 0.71 | 0.01 | 13.9 | 90.0 | 28.9 |
| Tails | 25.10 | 99.5 | 0.0444 | 0.081 | | | | | 10.0 | 71.1 |
| Feed | 25.22 | 100.00 | 0.44 | 0.11 | | | | | 100.0 | 100.0 |

The results of Runs No. 1–6 are summarized below in Table 6.

TABLE 6

| Run No. | Float | Mo | Bi | Cu | Fe | Insol. | Recovery |
|---|---|---|---|---|---|---|---|
| 1 | Selective | 44.2 | 7.25 | 0.11 | 8.15 | 32.0 | 80.9 |
| 2 | do | 48.9 | 3.85 | 0.21 | 2.70 | 38.9 | 92.0 |
| 3 | do | 54.6 | 12.10 | 0.38 | 3.15 | 17.0 | 94.4 |
| 4 | Bulk | 47.8 | 9.60 | 0.35 | 9.60 | 18.1 | { ¹ 92.3 ² 84.5 } |
| 5 | Selective | 79.4 | 6.56 | 0.26 | 0.71 | 13.9 | 90.0 |
| 6 | do | 95.3 | 0.99 | | | | |

¹ Mo.    ² Bi.

The results of Tables 4, 5 and 6 indicate that the column and process of the present invention can separate MoS₂ and Bi from molybdite ore with a grade of about 95% and a recovery of 94–95%.

EXAMPLE 5

*Flotation of copper from copper ore*

PROCEDURE

Five barrels of classifier overflow were utilized. Each barrel weighed 600 lb. at approximately 40% solids. The barrels were left to settle and the clear water was siphoned off.

The weight of solids used in every batch was determined by density measurement as shown in Experiment CP-13-1.

Conditioning time with lime and R208 (the sodium neutralized reaction product of diethyl and s-dibutyl phosphoric acids) was half and hour before adding Z6 (potassium amyl xanthate and frother).

The column operation was started 5 minutes after the addition of frother and half an hour was allowed for the column to reach equilibrium before sampling.

All of the overflows were collected during each experiment. The underflow rates and densities were determined at specific intervals by taking 1 liter sample which was then used for the composite underflow sample.

The total weight of the underflow was obtained using two methods:

(A)    density·flowrate·percent solids·time (B)    $\frac{\text{weight sample}}{\text{volume sample}}$·flowrate·time The density of the underflow averaged 2.53 g./ml. Methods A and B checked within less than 1%.

The overflow and underflow were filtered, dried, sampled and analysed. The results are given below.

EXPERIMENT OP-13-1

FEED

Weight of slurry _____ tons __ 0.0964
Density _____ g./ml __ 1.886
Solids _____ percent __ 72.0
Weight of solids _____ tons __ 0.0695
Factor _____ g. ton/lb __ 31.5

REAGENTS

Lime _____ 0.68 lb./ton=21.4 g.
R208 _____ 0.07 lb./ton=2.2 g.
Z6 _____ 0.01 lb./ton=0.3 g.
Triethoxy butane _____ 0.05 lb./ton=1.6 g.
Sodium sulphite _____ 0.23 lb./ton=7.3 g.

TEST

| Time, min. | Flowrate, ml./min. | Density, g./ml. | Air Rate, s.c.f.h. |
|---|---|---|---|
| 0 | 1,000 | 1.119 | 3.5 |
| 10 | 980 | 1.113 | 3.5 |
| 20 | 990 | 1.125 | 3.5 |
| 30 | 990 | 1.122 | 3.5 |
| 40 | 1,000 | 1.118 | 3.5 |
| 50 | 1,000 | 1.128 | 3.5 |
| 60 | 1,000 | 1.126 | 3.5 |
| 70 | 990 | 1.106 | 3.5 |
| 80 | 1,010 | 1.121 | 3.5 |
| 90 | 1,000 | 1.124 | 3.5 |
| 100 | 1,000 | 1.120 | 3.5 |
| 110 | 1,010 | 1.127 | 3.5 |
| 120 | 1,030 | 1.126 | 3.5 |

Duration of test _____ 120 min.
Average underflow rate _____ 1000 ml./min.
Average underflow density _____ 1.122 g./min.
Average underflow solids _____ 18.2 percent.
Volume of underflow collected _____ 13.0 liters.
Weight of underflow collected _____ 2.67 kg.
Total weight of underflow (calculated) __ 24.5 kg.
Total weight of overflow collected _____ 2.70 kg.

COLUMN CHARACTERISTICS

Diameter _____ inches __ 2
Lower zone _____ feet __ 12
Upper zone _____ do ____ 7
Capacity _____ ton/inch² day __ 0.115

RESULTS weight of overflow floated=9.94%
underflow analysis=0.20% Cu
overflow analysis=20.4% Cu
Copper Recovery=91.8%

EXPERIMENT OP-13-2

FEED

Weight of slurry _____ tons __ 0.0825
Density _____ g./ml __ 1.863
Solids _____ percent __ 72.0
Weight of solids _____ tons __ 0.0593
Factor _____ g. ton/lb __ 36.8

REAGENTS

Lime _____ 0.05 lb./ton=1.8 g.
R208 _____ 0.07 lb./ton=2.6 g.
Z6 _____ 0.01 lb./ton=0.4 g.
Sodium sulphite _____ 0.23 lb./ton=8.4 g.
Triethoxy butane _____ 0.09 lb./ton=3.3 g.

TEST

| Time, min. | Flowrate, ml./min. | Density, g./ml. | Air Rate, s.c.f.h. |
|---|---|---|---|
| 0 | 920 | 1.166 | 4.0 |
| 15 | 938 | 1.173 | 4.0 |
| 25 | 935 | 1.169 | 4.0 |
| 35 | 940 | 1.170 | 4.0 |
| 45 | 950 | 1.167 | 4.0 |
| 55 | 945 | 1.164 | 4.0 |
| 65 | 940 | 1.171 | 4.0 |
| 75 | 948 | 1.175 | 4.0 |
| 85 | 950 | 1.174 | 4.0 |
| 95 | 950 | 1.170 | 4.0 |
| 105 | 950 | 1.174 | 4.0 |

Duration of test _____ 105 min.
Average underflow rate _____ 942 ml./min.
Average underflow density _____ 1.170 g./ml.
Average underflow solids _____ 24.2 percent.
Volume of underflow collected _____ 11.0 liters.
Weight of underflow collected _____ Not recorded.
Total weight of underflow (calculated) _ 28.0 kg.
Total weight of overflow collected ____ 3.96 kg.

COLUMN CHARACTERISTICS

Diameter _____inches__ 2
Lower zone _____feet____ 12
Upper zone _____do_____ 7
Capacity _____ton/inch$^2$ day__ 0.155

RESULTS weight of overflow floated=12.4%
underflow analysis=0.09% Cu
overflow analysis=16.93% Cu
Copper Recovery=96.0%

EXPERIMENT OP-13-3

FEED

Weight of slurry _____tons__ 0.149
Density _____g./ml__ 1.928
Solids _____percent__ 73.5
Weight of solids _____tons__ 0.1095
Factor _____g. ton/lb__ 49.6

REAGENTS

Lime _____ 0.05 lb./ton=2.5 g.
R208 _____ 0.07 lb./ton=3.5 g.
Z6 _____ 0.01 lb./ton=0.5 g.
Triethoxy butane _____ 0.09 lb./ton=4.5 g.

TEST

| Time, min. | Flowrate, ml./min. | Density, g./ml. | Air Rate, s.c.f.h. |
|---|---|---|---|
| 0 | 650 | 1.261 | 5.0 |
| 20 | 770 | 1.200 | 5.0 |
| 40 | 825 | 1.187 | 5.0 |
| 60 | 820 | 1.190 | 5.0 |
| 80 | 820 | 1.208 | 5.0 |
| 100 | 850 | 1.189 | 5.0 |
| 120 | 815 | 1.200 | 5.0 |
| 140 | 840 | 1.220 | 5.0 |
| 160 | 815 | 1.199 | 5.0 |

Duration of test _____ 160 min.
Average underflow rate _____ 800 ml./min.
Average underflow density _____ 1.206 g./ml.
Average underflow solids _____ 28.2 percent.
Volume of underflow collected _____ Not recorded.
Weight of underflow collected _____ 30 kg.
Total weight of underflow (calculated) _ 43.5 kg.
Total weight of overflow collected ____ 6.10 kg.

COLUMN CHARACTERISTICS

Diameter _____inches__ 2
Lower zone _____feet____ 12
Upper zone _____do_____ 7
Capacity _____ton/inch$^2$ day__ 0.156

RESULTS weight of overflow floated=12.3%
underflow analysis=0.08% Cu
overflow analysis=18.35% Cu
Copper Recovery=96.7%

EXPERIMENT OP-13-4

FEED

Weight of slurry _____tons__ 0.137
Density _____g./ml__ 1.928
Solids _____percent__ 73.4
Weight of solids _____tons__ 0.104
Factor _____g. ton/lb__ 45.5

REAGENTS

Lime _____ 0.05 lb./ton=2.3 g.
R208 _____ 0.07 lb./ton=3.2 g.
Z6 _____ 0.01 lb./ton=0.4 g.
Triethoxy butane _____ 0.08 lb./ton=3.6 g.

TEST

| Time, min. | Flowrate, ml./min. | Density, g./ml. | Air Rate, s.c.f.h. |
|---|---|---|---|
| 0 | 995 | 1.209 | 4.5 |
| 15 | 1,030 | 1.191 | 4.5 |
| 30 | 1,000 | 1.190 | 4.5 |
| 45 | 1,025 | 1.186 | 4.5 |
| 60 | 1,030 | 1.199 | 4.5 |
| 75 | 1,060 | 1.202 | 4.5 |
| 90 | 1,050 | 1.203 | 4.5 |
| 105 | 1,080 | 1.190 | 4.5 |
| 120 | 1,050 | 1.196 | 4.5 |
| 135 | 1,040 | 1.202 | 4.5 |
| 150 | 1,060 | 1.196 | 4.5 |

Duration of test _____ 150 min.
Average underflow rate _____ 1040 ml./min.
Average underflow density _____ 1.196 g./ml.
Average underflow solids _____ 27.3 percent.
Volume of underflow collected _____ 11.0 liters.
Weight of underflow collected _____ 3.39 kg.
Total weight of underflow (calculated) _ 52.2 kg.
Total weight of overflow calculated from the combined overflow of OP-13-4, OP-13-5 and OP-13-6 (see feed OP-13-7) _____ 7.35 kg.

COLUMN CHARACTERISTICS

Diameter _____inches__ 2
Lower zone _____feet____ 12
Upper zone _____do_____ 7
Capacity _____ton/inch$^2$ day__ 0.198

RESULTS weight of overflow floated=12.3%
underflow analysis=0.12% Cu
overflow analysis (from composite feed OP-13-7)= 18.58% Cu
Copper Recovery=95.7%

EXPERIMENT OP-13-5

FEED

Weight of slurry remaining from OP-13-4
_____tons__ 0.0375
Weight of slurry _____do____ 0.1425
Density _____g./ml__ 1.923
Solids _____percent__ 73.3
Weight of solids _____tons__ 0.0769
Factor _____g. tons/lb__ 34.4

REAGENTS

Lime _____ 0.05 lb./ton=1.7 g.
R208 _____ 0.07 lb./ton=2.4 g.
Z6 _____ 0.01 lb./ton=0.3 g.
Triethoxy butane _____ 0.08 lb./ton=2.7 g.

TEST

| Time, min. | Flowrate, ml./min. | Density, g./ml. | Air Rate, s.c.f.h. |
|---|---|---|---|
| 0 | 1,050 | 1.187 | 4.0 |
| 15 | 1,080 | 1.166 | 4.0 |
| 30 | 1,080 | 1.167 | 4.0 |
| 45 | 1,040 | 1.159 | 4.0 |
| 60 | 1,080 | 1.159 | 4.0 |
| 75 | 1,040 | 1,162 | 4.0 |
| 90 | 1,080 | 1.154 | 4.0 |
| 105 | 1,100 | 1.149 | 4.0 |
| 120 | 1,120 | 1.144 | 4.0 |
| 135 | 1,100 | 1.152 | 4.0 |
| 150 | 1,100 | 1.152 | 4.0 |
| 165 | 1,080 | 1.146 | 3.5 |
| 180 | 1,080 | 1.142 | 3.5 |

Duration of test _____ 180 min.
Average underflow rate _____ 1080 ml./min.
Average underflow density _____ 1.156 g./ml.
Average underflow solids _____ 22.3 percent.
Volume of underflow collected _____ 10.0 liters.
Weight of underflow collected _____ 2.56 kg.
Total weight of underflow (calculated) __ 49.8 kg.
Total weight of overflow calculated from combined overflow OP-13-4, OP-13-5 and OP-13-6 (see feed OP-13-7) ___ 7.65 kg.

COLUMN CHARACTERISTICS

Diameter _____inches__ 2
Lower zone _____feet__ 12
Upper zone _____do____ 7
Capacity _____tons/inch² day__ 0.161

RESULTS

Weight of overflow floated=13.3%
Underflow analysis=0.12% Cu
Overflow analysis (from composite feed OP-13-7)=18.58% Cu
Copper recovery=95.9%

EXPERIMENT OP-13-6

FEED

Weight of slurry remaining from OP-13-5 __tons__ 0.048
Weight of slurry _____do____ 0.155
Density _____g./ml_ 1.952
Solids _____percent__ 76.4
Weight of solids _____tons__ 0.083
Factor _____g. tons/lb__ 37.5

REAGENTS

Lime _____ 0.05 lb./ton=1.9 g.
R208 _____ 0.07 lb./ton=2.6 g.
Z6 _____ 0.01 lb./ton=0.4 g.
Triethoxy butane _____ 0.08 lb./ton=3.0 g.

TEST

| Time, min. | Flowrate, ml./min. | Density, g./ml. | Air Rate, s.c.f.h. |
|---|---|---|---|
| 0 | 1,030 | 1.182 | 4.0 |
| 15 | 940 | 1.189 | 4.0 |
| 30 | 975 | 1.177 | 4.0 |
| 45 | 1,005 | 1.172 | 4.0 |
| 60 | 1,000 | 1.177 | 4.0 |
| 75 | 990 | 1.181 | 4.0 |
| 90 | 1,010 | 1.176 | 4.0 |
| 105 | 1,015 | 1.170 | 4.0 |
| 120 | 1,030 | 1.186 | 4.0 |
| 135 | 1,040 | 1.172 | 4.0 |
| 150 | 1,040 | 1.188 | 4.0 |
| 165 | 1,005 | 1.170 | 4.0 |
| 180 | 1,000 | 1.178 | 4.0 |
| 195 | 1,000 | 1.170 | 4.0 |
| 210 | 1,040 | 1.172 | 4.0 |
| 225 | 1,020 | 1.153 | 4.0 |
| 240 | 1,000 | 1.145 | 4.0 |

Duration of test _____ 240 min.
Average underflow rate _____ 1009 ml./min.
Average underflow density _____ 1.174 g./ml.
Average underflow solids _____ 24.5 percent.
Volume of underflow collected _____ 17.0 liters.
Weight of underflow collected _____ 4.72 kg.
Total weight of underflow (calculated) __ 68.8 kg.
Total weight of overflow from combined overflow OP-13-4, OP-13-5 and OP-13-6 (see feed OP-13-7) _____ 10.5 kg.

COLUMN CHARACTERISTICS

Diameter _____inches__ 2
Lower zone _____feet__ 12
Upper zone _____do____ 7
Capacity _____tons/inch² day__ 0.167

RESULTS

Weight of overflow floated=13.3%
Underflow analysis=0.11% Cu
Overflow analysis (from composite feed OP-13-7)=18.58% Cu
Copper recovery=96.1%

EXPERIMENT OP-13-7

FEED

Weight of combined overflow slurry from Experiments OP-13-4, OP-13-5 and OP-13-6 ___lb__ 102.0
Density _____g./ml__ 1.693
Solids _____percent__ 56.2
Weight of combined overflow _____lb__ 57.3

REAGENTS

Sodium sulphite _____ 0.23 lb./ton ore=22.0 g.
Triethoxy butane _____ 0.025 lb./ton feed=0.3 g.

TEST

| Time, min. | Flowrate, ml./min. | Density, g./ml. | Air Rate, s.c.f.h. |
|---|---|---|---|
| 0 | 230 | 1.106 | 0.35 |
| 15 | 230 | 1.117 | 0.35 |
| 30 | 225 | 1.109 | 0.35 |
| 45 | 222 | 1.110 | 0.35 |
| 60 | 210 | 1.103 | 0.35 |
| 75 | 217 | 1.095 | 0.35 |
| 90 | 217 | 1.128 | 0.35 |
| 105 | 218 | 1.133 | 0.35 |
| 120 | 217 | 1.109 | 0.35 |
| 135 | 213 | 1.134 | 0.35 |
| 150 | 213 | 1.129 | 0.35 |

Weight of dry overflow collected _____ 6.23 kg.
Weight of dry underflow collected _____ 5.33 kg.
Total weight _____ 11.56 kg.

COLUMN CHARTERISTICS

Diameter _____inch__ 1
Lower zone _____feet__ 12
Upper zone _____do____ 6
Capacity _____tons/inch² day__ 0.621

RESULTS

Weight of overflow floated=53.9%
Analysis of underflow=6.92% Cu
Analysis of overflow=28.5% Cu
Copper concentrate recovery=82.6%
Copper middling returned to circuit=17.1%

These results are summarized below.

TABLE 7.—SUMMARY OF RESULTS

| Test No. | Percent Cu in Conc. | Percent Cu in Tailings | Recovery |
|---|---|---|---|
| OP-13-1 | 20.4 | 0.20 | 91.8 |
| 2 | 16.9 | 0.09 | 96.0 |
| 3 | 18.4 | 0.08 | 96.7 |
| 4 | 18.6 | 0.12 | 95.7 |
| 5 | 18.6 | 0.12 | 95.9 |
| 6 | 18.6 | 0.11 | 96.1 |
| 7 | 28.5 | 6.92 | [1] 82.6 / [2] 17.1 |

[1] Concentrate.  [2] Middling.

The feed for Test 7 was obtained by collecting the overflow of Tests 4, 5 and 6. The underflow from this test would be returned to the grinding circuit and from there it would become part of the feed to the rougher scavenger column.

The results summarized in Table 7 indicate that the apparatus and process of the present invention can be used to flotate copper values from a copper ore. The percentage copper in the concentrate ranges from 16.9–20.4, the percentage copper in the tailings ranged from 0.08 to 0.20, and the recovery is from 91.8–96.7%.

We claim:
1. A froth flotation method for the separation of one constituent from another constituent in a comminuted mixture of said constituents wherein a constituent thereof, which is at that time hydrophobic, is withdrawn as a froth with air, said method comprising:
 (a) establishing and maintaining a downwardly flowing stream of aqueous medium within a vertically aligned, elongated zone, said aqueous medium being introduced at an upper portion of said zone;
 (b) establishing and maintaining an upwardly moving stream of air bubbles originating at a lower portion of said zone, wherein the downward velocity of said aqueous medium is not greater than the upward velocity of said stream of air bubbles;
 (c) establishing an aqueous slurry of said comminuted mixture and at least one conditioning agent which renders a selected said constituent hydrophobic;
 (d) introducing said slurry into said zone at a region in said zone above said lower portion but below said upper portion at such a rate that the solids content of said slurry is greater than the solids content in said zone;
 (e) withdrawing constituent rendered hydrophobic and air as overflow at the upper region of said zone at a point above said downwardly flowing stream, said constituent rendered hydrophobic and said air moving co-currently to said upper portion;
 (f) withdrawing said other constituent and aqueous medium as underflow at the lower region of said zone at a point below the introduction of said upwardly moving stream, said other constituent and said aqueous medium moving co-currently to said lower portion.

2. A froth flotation method for the separation of the values from the gangue in a comminuted mixture of ore, wherein a constituent thereof, which is at that time hydrophobic, is withdrawn as a froth with air, said method comprising:
 (a) establishing and maintaining a downwardly flowing stream of water within a vertically aligned, elongated zone, said water being introduced at an upper portion of said zone, said upper portion of said zone constituting one-fourth of the height of said zone;
 (b) establishing and maintaining an upwardly moving stream of air bubbles originating at a lower portion of said zone, wherein the downward velocity of said water is not greater than the upward velocity of said stream of air bubbles, said lower portion of said zone constituting one-fourth of the height of said zone;
 (c) establishing an aqueous slurry of said comminuted mixture and at least one conditioning agent which renders the values in said ore hydrophobic;
 (d) introducing said slurry into said zone at a region in said zone above said lower portion but below said upper portion at such a rate that the solids content of said slurry is greater than the solids content in said zone;
 (e) withdrawing said values and air as overflow at the upper region of said zone at a point above the introduction of said downwardly flowing stream, said values being in the form of solid particles adhered to said bubbles, said withdrawn material having moved co-currently with said air to said upper portion; and
 (f) withdrawing said gangue and water as underflow at the lower region of said zone at a point below the introduction of said upwardly moving stream, said withdrawn material having moved co-currently with said water to said lower portion, the ratio of the height to width of said vertically elongated zone being at least 6:1.

3. A froth flotation method for the separation of the values from the gangue in a comminuted mixture of ore, wherein a constituent thereof, which is at that time hydrophobic, is withdrawn as a froth with air, said method comprising:
 (a) establishing and maintaining a downwardly flowing stream of water within a vertically aligned elongated zone, said water being introduced at an upper portion of said zone, said upper portion of said zone constituting one-fourth of the height of said zone;
 (b) establishing and maintaining an upwardly moving stream of air bubbles originating at a lower portion of said zone, wherein the downward velocity of said water is not greater than the upward velocity of said stream of air bubbles, said lower portion of said zone constituting one-fourth of the height of said zone;
 (c) establishing an aqueous slurry of said comminuted mixture and at least one conditioning agent which renders the gangue in said ore hydrophobic;
 (d) introducing said slurry into said zone at a region in said zone above said lower portion but below said upper portion at such a rate that the solids content of said slurry is greater than the solids content in said zone;
 (e) withdrawing said gangue and air as overflow at the upper region of said zone at a point above the introduction of said downwardly flowing stream, said gangue being in the form of solid particles adhered to said air bubbles, said withdrawn material having moved co-currently with said air to said upper portion; and
 (f) withdrawing said values and water as underflow at the lower region of said zone at a point below the introduction of said upwardly moving stream, said withdrawn material having moved co-currently with said water to said lower portion, the ratio of the height to width of said vertically elongated zone being at least 6:1.

4. The method of claim 2 wherein
 (i) said ore is iron ore;
 (ii) said stream of air bubbles is established and maintained by passing air at a rate of 1050 ml./min. upwardly through a perforated member;
 (iii) said aqueous slurry has a pH of 6.3 and includes said iron ore, about 590 gms./ton solids of sulphuric acid, about 227 gms./ton solids of sulphonated petroleum and 1 lb./ton solids of tall oil, said slurry having a solids content of about 70%;
 (iv) dolomite and iron values are withdrawn as overflow; and
 (v) quartz is withdrawn as underflow.

5. The method of claim 2 wherein
 (i) said ore is molybdite ore;
 (ii) said stream of air bubbles is established and maintained by passing air at a rate of 4.0 s.c.f.m. upwardly through a perforated member;
 (iii) said aqueous slurry includes said molybdite ore, 45 gms./ton solids of kerosene, 23 gms./ton solids of pine oil, 23 gms./ton solids of Dowfroth, and 45 gms./ton potassium amyl xanthate, said slurry having a solids content of about 13%;
 (iv) said slurry is introduced at a flow rate of 1360 ml./min. such that the solids content of said slurry is greater than the solids content in said zone;
 (v) molybdenum sulphide and bismuth are withdrawn as overflow; and
 (vi) gangue is withdrawn as underflow.

6. The method of claim 2 wherein
 (i) said ore is molybdenite ore;

(ii) said stream of air bubbles is established and maintained by passing air at a rate of 4.0 s.c.f.m. upwardly through a perforated member;
(iii) said aqueous slurry includes said ore and 45 gms./ton solids of kerosene, 23 gms./ton solids of pine oil, 23 gms./ton solids of Dowfroth 250, and 0.2 lb./ton solids of sodium silicate, said slurry having a solids content of about 12%;
(iv) said slurry is introduced at a rate of 1360 ml./min. such that the solids content of said slurry is greater than the solids content in said zone;
(v) molybdenum sulphide is withdrawn as overflow; and
(vi) gangue is withdrawn as underflow.

7. The method of claim 2 wherein
(i) said ore is copper ore;
(ii) said stream of air bubbles is established and maintained by passing air at a rate of 4.5–5.0 s.c.f.m. upwardly through a perforated member;
(iii) said aqueous slurry includes said ore and 23–309 gms./ton solids of lime, 317 gms./ton solids of the sodium neutralized reaction product of diethyl and s-dibutyl phosphoric acids, 4.5 gms./ton solids of potassium amyl xanthate and 23–41 gms./ton solids of triethoxy butane, said slurry having a solids content of about 56 to about 76%;
(iv) said slurry is introduced at a rate of about 650 to about 1080 ml./min., such that the solids content of said slurry is greater than the solids content in said zone;
(v) copper values are withdrawn as overflow; and
(vi) gangue is withdrawn as underflow.

8. The method of claim 2 wherein
(i) said ore is copper ore;
(ii) said stream of air bubbles is established and maintained by passing air at a rate of 3.5–4.0 s.c.f.m. upwardly through a perforated member;
(iii) said aqueous slurry includes said ore and 23–309 gms./ton solids of lime, 317 gms./ton solids of the sodium neutralized reaction product of diethyl and s-dibutyl phosphoric acids, 4.5 gms./ton solids of potassium amyl xanthate and 23–41 gms./ton solids of triethoxy butane and 104 gms./ton solids of sodium sulphite, said slurry having a solids content of about 56 to about 76% solids;
(iv) said slurry is introduced at a rate of about 920–1080 ml./min. such that the solids content of said slurry is greater than the solids content in said zone;
(v) copper values are withdrawn as overflow; and
(vi) gangue is withdrawn as underflow.

9. The method of claim 2 wherein
(i) said ore is copper ore;
(ii) said stream of air bubbles is established and maintained by passing air at a rate of 0.35 s.c.f.m. upwardly through a perforated member;
(iii) said aqueous slurry includes said ore and 104 gms./ton solids of sodium sulphite and 11 gms./ton solids of triethoxy butane, said slurry having a solids content of about 56%;
(iv) said slurry is introduced at a rate of about 210 to about 230 ml./min. such that the solids content of said slurry is greater than the solids content in said zone;
(v) copper values are withdrawn as overflow; and
(vi) gangue is withdrawn as underflow.

10. The method of claim 2 wherein the upwardly moving stream of air bubbles is produced by passing air through a perforated member, the pressure of air being defined by the formula $$p = hd + k$$

wherein
$p$ is the pressure
$h$ is the height of the zone
$d$ is the average density of the contents within said zone and
$k$ is a factor which is greater than 0 but less than 7.

11. The method of claim 3 wherein the upwardly moving stream of air bubbles is produced by passing air through a perforated member, the pressure of air being defined by the formula $$p = hd + k$$

wherein
$p$ is the pressure
$h$ is the height of the zone
$d$ is the average density of the contents within said zone and
$k$ is a factor which is greater than 0 but less than 7.

12. The method of claim 3 wherein
(i) said ore is iron ore;
(ii) said stream of air bubbles is established and maintained by passing air at a rate of 325–2400 ml./min. through a perforated member;
(iii) said aqueous slurry has a pH of 11 and includes said iron ore, 1 lb./ton of solids of dextrin and 1 lb./ton solids content of primary coconut oil amine, said slurry having a solids content of about 65–75%;
(iv) said slurry is introduced at a flow rate of 66–146 ml./min. such that the solids content of said slurry is greater than the solids content in said zone;
(v) quartz is withdrawn as overflow; and
(vi) iron values are withdrawn as underflow.

13. The method of claim 3 wherein
(i) said ore is iron ore;
(ii) said stream of air bubbles is established and maintained by passing air at a rate of 650 ml./min. upwardly through a perforated member;
(iii) said aqueous slurry includes said iron ore, 227 gms./ton solids of lime, 114 gms./ton solids of starch, 114 gms./ton solids of sulphonated petroleum and 114 gms./ton solids of tall oil, said slurry having a solids content of about 72%;
(iv) quartz is withdrawn as overflow; and
(v) iron values are withdrawn as underflow.

References Cited

UNITED STATES PATENTS

| | | | |
|---|---|---|---|
| 1,254,173 | 1/1918 | Terry | 209—168 X |
| 1,367,332 | 2/1921 | Towne | 209—17 |
| 1,869,241 | 7/1932 | Elie | 209—168 X |
| 2,047,989 | 7/1936 | Woelfflin | 210—44 X |
| 2,088,497 | 7/1937 | Tijmstra | 23—270.5 X |
| 2,259,243 | 10/1941 | Daman | 209—165 |
| 2,330,875 | 10/1943 | Ellis | 209—166 X |
| 2,423,022 | 6/1947 | Herkenhoff | 209—166 |
| 2,561,251 | 7/1951 | Van Aardt | 209—166 |
| 2,811,255 | 10/1957 | Nokes | 209—167 |
| 2,897,144 | 7/1959 | Bieber | 209—166 X |
| 3,037,627 | 6/1962 | Hazen | 209—166 |

FOREIGN PATENTS

| | | |
|---|---|---|
| 213,141 | 6/1907 | Germany. |
| 121,991 | 6/1948 | Sweden. |

OTHER REFERENCES

Taggart, Handbook of Mineral Dressing, Wiley & Sons, 1945 (12–40 through 12–47).

BARRY B. THORNTON, *Primary Examiner.*

R. HALPER, *Assistant Examiner.*